US007013028B2

(12) United States Patent
Gont et al.

(10) Patent No.: US 7,013,028 B2
(45) Date of Patent: Mar. 14, 2006

(54) ADVANCED SCHEMATIC EDITOR

(75) Inventors: Val Gont, Kanata (CA); Jason Abt, Kanata (CA); Larry Lam, Orleans (CA)

(73) Assignee: Semiconductor Insights Inc., Ontario (CA)

( * ) Notice: Subject to any disclaimer, the term of this patent is extended or adjusted under 35 U.S.C. 154(b) by 757 days.

(21) Appl. No.: 09/920,937

(22) Filed: Aug. 3, 2001

(65) Prior Publication Data

US 2002/0018583 A1   Feb. 14, 2002

(30) Foreign Application Priority Data

Aug. 9, 2000   (CA)   .................................. 2315548

(51) Int. Cl.
G06K 9/00   (2006.01)

(52) U.S. Cl. ...................... 382/113; 700/182; 706/919; 716/12; 715/724

(58) Field of Classification Search ................ 382/141, 382/144, 145, 147, 151, 284, 294, 113; 29/833; 438/16; 700/182; 709/919; 715/724
See application file for complete search history.

(56) References Cited

U.S. PATENT DOCUMENTS

| | | | | |
|---|---|---|---|---|
| 5,544,067 A | * | 8/1996 | Rostoker et al. | 703/14 |
| 5,568,397 A | * | 10/1996 | Yamashita et al. | 716/11 |
| 5,694,481 A | * | 12/1997 | Lam et al. | 382/145 |
| 6,077,308 A | * | 6/2000 | Carter et al. | 716/8 |
| 6,230,305 B1 | * | 5/2001 | Meares | 716/11 |
| 6,285,369 B1 | * | 9/2001 | Kross et al. | 345/419 |
| 6,654,947 B1 | * | 11/2003 | North et al. | 717/101 |

* cited by examiner

Primary Examiner—Samir Ahmed
Assistant Examiner—Anand Bhatnagar
(74) Attorney, Agent, or Firm—Sterne, Kessler, Goldstein & Fox, P.L.L.C.

(57) ABSTRACT

An editor in a computer system for editing an schematic having a number of pages. The editor may cut a selected portion of the schematic from any one of the schematic pages, paste the cut portion of the schematic onto any one of the schematic pages, and connect nets located on the same schematic page. The editor may search for objects such as signal labels and cells within the schematic netlist as well as other editing functions. Further a navigator is provided for interactively viewing netlist data from a high level schematic where the data includes schematic page numbers, cell names, nets, signal labels and segments. The project viewer software and project schematic netlist data may be contained in a computer-readable medium. The project viewer software controls output schematic images and enables a user to view, trace and search objects throughout the project netlist data.

17 Claims, 6 Drawing Sheets

ADVANCED SCHEMATIC EDITOR

CROSS-REFERENCE TO OTHER APPLICATIONS

This application claims the benefit of the Canadian Patent Application Ser. No. 2,315,548, filed Aug. 9, 2000.

Furthermore, the following applications of common assignee are related to the present application, have the same filing dates as the present application, and are incorporated by reference in their entireties:

"Gate Extractor", Ser. No. 09/920,843; and

"Schematic Organization Tool", Ser. No. 09/920,734.

FIELD OF THE INVENTION

The invention relates generally to integrated circuit design analysis, and more particularly to an editor for schematics.

BACKGROUND OF THE INVENTION

In the intensely competitive field of microelectronics, detailed analysis of a semiconductor integrated circuit product can provide valuable information as to how a particular technical problem was addressed, overall strengths and weaknesses of a design approach, and such matters. This information can be used to make decisions regarding market positioning, future designs, and new product development. The information produced from analysis of the product is typically provided through circuit extraction (reverse engineering), functional analysis, and other technical means. At the core of this activity is the process of design analysis which, in this context, refers to the techniques and methodology used to derive a complete or partial set of schematics from any type of integrated circuit manufactured using any process technology. For such technical information to be of strategic value it must be accurate and cost effective, and it is very important that the information should be generated in a timely manner.

A design analysis process typically involves skilled engineers manually extracting circuit information from a set of large "photomosaics" of an integrated circuit (IC). Skilled technicians and engineers perform the following sequential tasks:

(1) A high magnification image of a small portion of an IC is captured using a camera or electron microscope. The IC has been processed to expose a layer of interest.

(2) Step (1) is repeated for all of the various regions of interest of the layer of the IC, ensuring that sufficient overlap exists between adjacent images that will be used to create the photomosaics.

(3) Create Photomosaics: all adjacent photographs associated with the given IC layer are aligned and taped together.

(4) Steps (1)–(3) are repeated for every layer necessary to construct a layout database of the IC. All layers include interconnect layers. For example, four sets of photomosaics are required for a device with three layers of metal and one layer of polysilicon.

(5) Circuit Extraction: transistors, logic gates, and other elements employed in the IC are identified by manually, visually examining the polysilicon and lower metal interconnects photomosaics. Interconnections between circuit elements are traced and this information is captured in the form of schematic drawings. The drawings are manually checked against the photomosaics and any obvious errors are corrected.

(6) Organize Schematics: the schematic drawings are organized into hierarchical functional/logical blocks.

(7) Capture Schematics: the schematic drawings are entered into a computer using computer aided engineering (CAE) software tools for subsequent simulation and functional analysis of the IC.

The results of these substantially manual techniques for circuit extraction are often difficult to analyze. Difficulties arise in tracing signals that travel between several schematics. Locating the schematics associated with a particular signal can be very time consuming. During the circuit extraction process, signals are commonly given a generic name or label as a reference. Further analysis will reveal the purpose or function of these signals. The signals should then be renamed so that their name indicates their function. The signal renaming process creates two problems. Firstly, it takes some time to locate each schematic associated with a particular signal such that the signal can be relabeled on each schematic where it appears. Secondly, guaranteeing that the signal has been renamed on each schematic is difficult. This can result in inconsistencies with signal names that can confuse the engineer attempting to analyze the circuitry.

Another time consuming task associated with this manual circuit extraction process is the creation of signal and schematic lists. It is often useful to have a cross-reference between signal names and the name or number of the schematic in which these signals appear. However, such a cross-reference is very labor intensive to produce.

Once the schematics have been entered into a computer for simulation and/or subsequent analysis, it becomes difficult to edit the schematics. For example, as the circuit analysis progresses, it frequently becomes necessary to redraw certain schematics or to transfer portions of one schematic to another. Editing a set of schematics in such a way can often cause errors in the net list which require manual correction. Signal names and other labels on the revised schematics will also have to be manually changed.

Other than the manual method described above, the design analysis process can alternatively employ an automated circuit extraction process such as the one described in U.S. Pat. No. 5,694,481 which issued on Dec. 2, 1997 to Lam et al. Lam discloses an automated system for extracting design information from a semiconductor integrated circuit by imaging layers of an IC, creating a mosaic of the images, identifying the circuit elements, developing a basic net list of the circuit element connections, organizing the net list into functional blocks, and generating schematic diagrams.

Unfortunately, the circuit extraction method disclosed by Lam has the same restrictions as the manual method when in comes to locating signals and schematics, creating signal and schematic lists, and editing existing schematics. In fact, the automated method adds the burden of identifying logic gates and standard cells from a randomly organized net list. An engineer is required to sort through the schematics to convert the connected transistors into the relevant logic gates and standards cells. Obviously, this can take a very long period of time.

In order to organize numerous pages of schematics, analysts use schematic editing and simulating software such as Viewlogic/Innoveda's ViewDraw software. This software has a number of editing options that can be performed including operations such as cut, copy, paste, and search. However, these software packages were designed for integrated circuit designers rather then for analysts who reverse engineer integrated circuits and printed boards. The following limitations of ViewDraw create difficulties and inconveniences for users in organizing schematics:

1. The cut procedure does not preserve interconnections at the boundary of cells.
2. The paste procedure does not restore the wire or net interconnections that are lost for cells that are copied or cut elsewhere in the schematic.
3. There is no way to automate the connection of a selected net or wire to the appropriate nets or wires on a schematic page.
4. The signal and cell search is limited to a currently opened schematic page only and doesn't consider sublevels of a flat type project.
5. The search procedures do not provide very important information about objects such as: origin and destination of a signal, exact location in the project, and user descriptions (annotations) of objects.
6. There is no cell/gate search based on important properties such as: label, XY coordinates relative to the layout location of objects, and user defined attributes.
7. There are no global editing capabilities such as: adding or removing particular wires, labels, and/or cells for local signals and IN/OUT symbols.
8. There is no safe way of cutting a net or wire and preserving both ends and their labels. This is needed when manually disconnecting a gate, a block of gates or a cell from the rest of the schematic.

In the preparation of project reports regarding the results of a reverse engineered integrated circuit, hard copy printouts and Adobe Acrobat format documents are normally used. This limits customers in the ability to analyse the project data, to trace signals throughout the project schematic, and to follow the approach used in the design of the schematics. There is a need to create a project viewer that combines a schematic view, project objects and extended search capabilities.

Therefore, there is a need for an advanced schematic editor and navigator which would allow a user to manipulate the schematics of an entire project and to navigate through the entire project in order to analyse it.

SUMMARY OF THE INVENTION

The invention is directed to an editor in a computer system for editing a schematic having a number of pages. The editor includes a module for cutting a selected portion of the schematic from any one of the schematic pages, a module for pasting the cut portion of the schematic onto any one of the schematic pages, and a module for connecting nets having the same label that are located on the same schematic page.

In accordance with another aspect of this invention, the editor further includes a module for searching for objects within the schematic netlist. The editor may search for and generate a list of signal labels found on a preselected schematic page or it may search for and provide a list of pages on which the signal label is found. The editor may also search for and generate a list of cells found on a preselected schematic page or it may search for and provide a list of schematic pages on which the cell is found. The cells may be searched by cell coordinates, name label or attributes.

In accordance with a further aspect of the present invention, the editor may further include a module for eliminating extra pins or segment endings on a schematic, a module for rendering invisible the labels on a current active page or on all of the schematic pages, a module for adding IN/OUT elements to pin segments and/or a module for cutting a net on a schematic and providing a signal label to the two cut ends of the net.

In accordance with another aspect, the present invention is directed to a navigator in a computer system for interactively viewing netlist data from a high level schematic where the data includes schematic page numbers, cell names, nets, signal labels and segments. The viewing process comprises generating a hierarchal structure of the schematic on one pane of a split screen, a selected part of the schematic on another pane of the split screen, a list of cell names in a window on the screen and a list of signal labels in another window on the screen; the hierarchal structure may be organized by schematic pages.

In accordance with a further aspect, the present invention is directed to a computer-readable medium containing project viewer software and project schematic netlist data including schematic page numbers, cell names, nets, signal labels and segments. The project viewer software controls output schematic images and enables a user to view, trace and search objects through out the project netlist data.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

The Advanced Schematic Editor (ASE) in accordance with the present invention is designed as an Object Linking and Embedding (OLE) controller software in order to be able to communicate with the ViewDraw application. The software utilizes Microsoft OLE technology to establish a link to ViewDraw view and document objects. Using this link, ASE has direct access to all active page objects such as labels, segments, components, and attributes of the schematics and the page itself. At the same time, the link allows ASE to modify objects and their properties. In an important addition to the OLE communication, ASE has direct access to the source file of the reverse engineered project. The access to the source files allows ASE to perform broader and more flexible searches and analyses of the objects and their properties throughout whole project.

The Advanced Schematic Editor (ASE) in accordance with the present invention provides routines for performing advanced functions with the schematic source files. The source files may be of the type produced using a co-pending application entitled Schematic Organization Tool and filed on even date by Gont et al which is incorporated herein by reference. These functions include the capability of cutting a cell or gate from one location and pasting it into another location in the project schematic without losing any wire/net and/or signal information, and to connect nets/wires on schematic pages. The functions further include the capability to search signals and cells, edit local segments, make local labels invisible on one or all pages, add input/output components and cut a wire/net.

Figure 1:
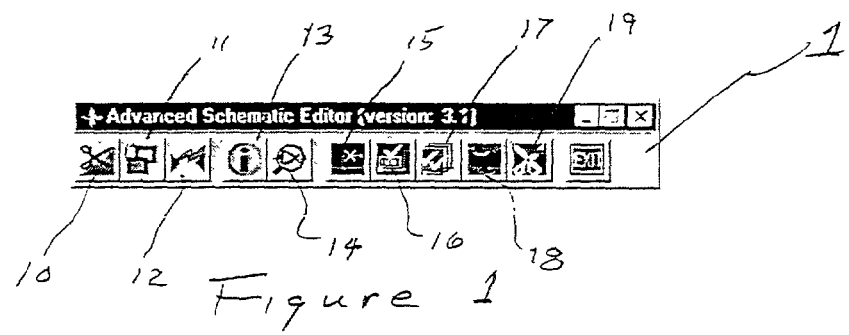
FIG. 1 shows the ASE option buttons on the GUI toolbar.

FIG. 1 illustrates the main GUI toolbar 1 that shows the ASE option buttons. The toolbar includes the CUT button 10, PASTE button 11, CONNECT button 12, signal search button 13, component search button 14, local segments editor button 15, local labels invisible on current page button 16, local labels invisible on all pages button 17, add IN/OUT components button 18, and net cutter button 19.

The CUT and PASTE functions of ASE allows a user to edit the circuits in the project schematic. In addition to moving sections of circuits, whether they consist of one or more cells on one page, these sections may be moved to other schematic pages. In particular, the selected cells can be cut from one schematic page and inserted into a different schematic page. In so doing, the input and output signal information for the components is retained by the system and the database of input/outputs are updated to store the new locations of these signals. In addition, when components are inserted into a different schematic page, the interconnections for common signals will be made. Such a function is particularly useful for rearranging schematics so that they make more sense to the engineer analysing the circuits.

When one or more cells are to be cut, the cells are selected and the CUT button 10 is actuated. As a result, ASE first reads the selection of cells by their labels (names) and stores the names into memory as an array of cells to be cut. Second, all wire labels connected to the cells, collected in the previous step, are stored in memory as an array of wires. Third a clipboard cut operation of the selection is executed. Then, it is expected that the user will move to the schematic page on which the selected cells are to be inserted. To discard the selection and select some other portion of the schematic, the user can execute the ViewDraw undo command and make a new selection.

In order to insert the clipped selection of cells into a different schematic page selected by the user, the activation of the PASTE button 11 places the selection of cells or objects on a vacant place of the currently selected page and maintains the new block selected. All wires connected to the selection are read and compared with the array of original wire labels. Next, if there is a difference between new block wires and the wires in the original array, single segments and labels are created according to the original block configuration. Finally, the function deselects the block.

In order to connect wires having the same label, a net label is selected and the CONNECT button 12 is activated. The selected label is read and the net ending pin as the origin of a new connection is located. Next, the function searches for the same net label on the same page. If found, the function looks for the ending pin of the found net as a destination. Finally, the "draw net" ViewDraw OLE command is executed to draw a wire between the pins.

Further advanced functions performed by ASE using the schematic project source files include searching objects such as signals and cells. Signals may be traced from one page to another of the schematics. Thus if a particular signal is selected on a page, it is recognized and the entire project netlist can be searched to identify all of the pages that include that particular signal; the closed and open schematics where the particular signal appears can then be viewed in any sequence desired. The position of a selected cell may be found and identified by schematic page number and coordinate; further the size of the cell can be provided. In addition, when the cursor is clicked on the schematic file object, the appropriate schematic page will pop up.

In the Signal Search module, the search options available are to list the signals on a currently active schematic page, to find the string of signals selected by the user, and to print the search results. As illustrated on FIG. 2, these functions are controlled by the buttons on the expanded signal search GUI 20. In particular, these are Signal List button 21, Find button 22 and Print button 23. The "Signal list" function reads and outputs all signals from the currently active or selected schematic page. The "Find" function takes a search string from the text box 24 and performs a global search for the string throughout complete project schematic directory. The "Find" option accepts wild card characters. The "Print" function dumps a search result into a text file and then loads the file data into the windows notepad for further editing and actual print.

Figure 2:
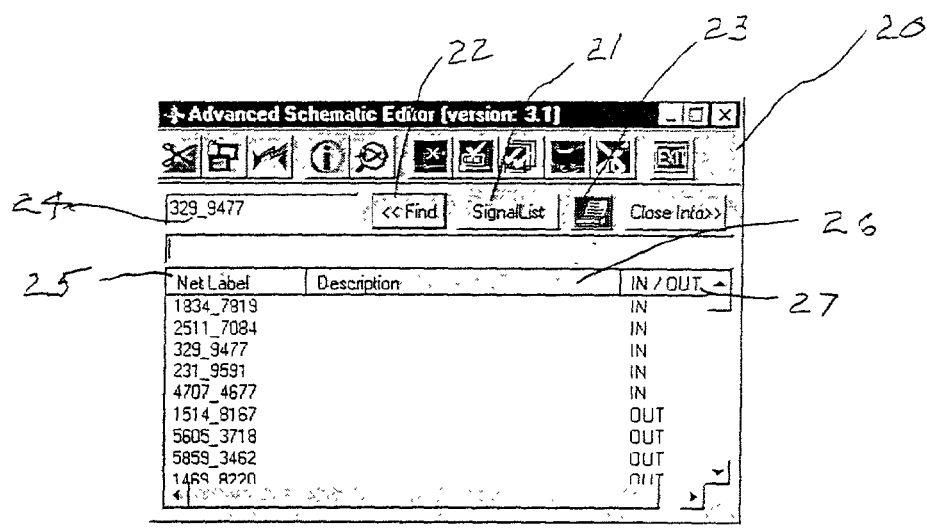
FIG. 2 shows the expanded signal search GUI.

The signal search module outputs the search results in records with three fields as shown on FIG. 2. In the first column, the Net Label 25 is identified. In the second column the Description 26 of the signal is identified. The Description is the schematic and project specific user defined string describing the functionality of the net. The field is empty if the user has not assigned any meaning to the net. The third column entitled IN/OUT 27 reflects whether a net is an input (destination) or output (source). This field can be empty if the software cannot identify the direction and there is no "IN/OUT" component connected to the net.

Figure 3:
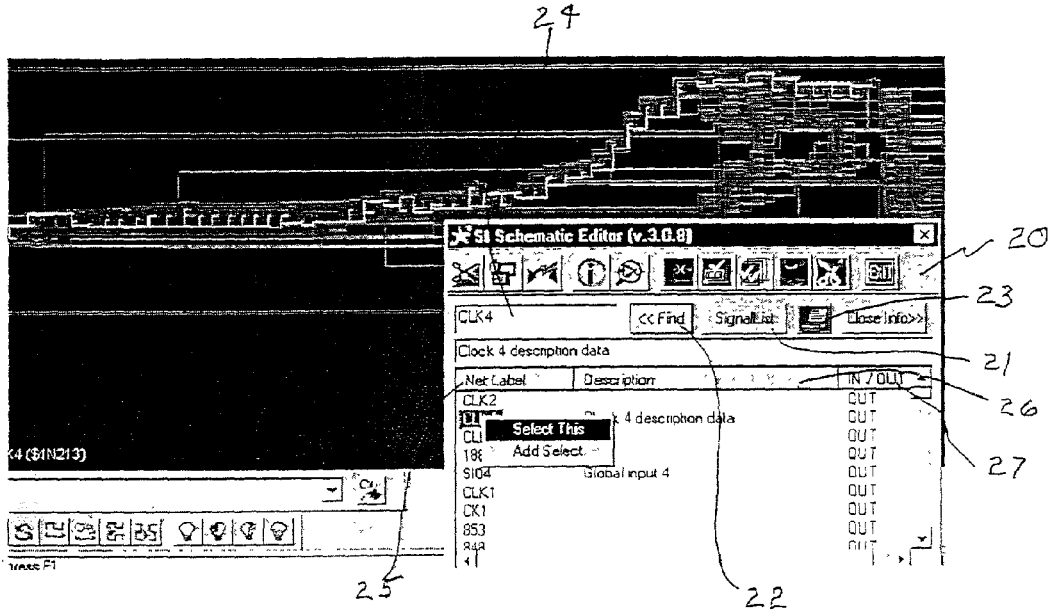
FIG. 3 shows a net trace.

To trace a net throughout the project the user is required to select a net label of particular interest and double click on it. The software opens an appropriate page and highlights the net to show it to the user. FIG. 3 is an example of a net trace. A net label list is generated by applying "Signal list" option.

Figure 4:
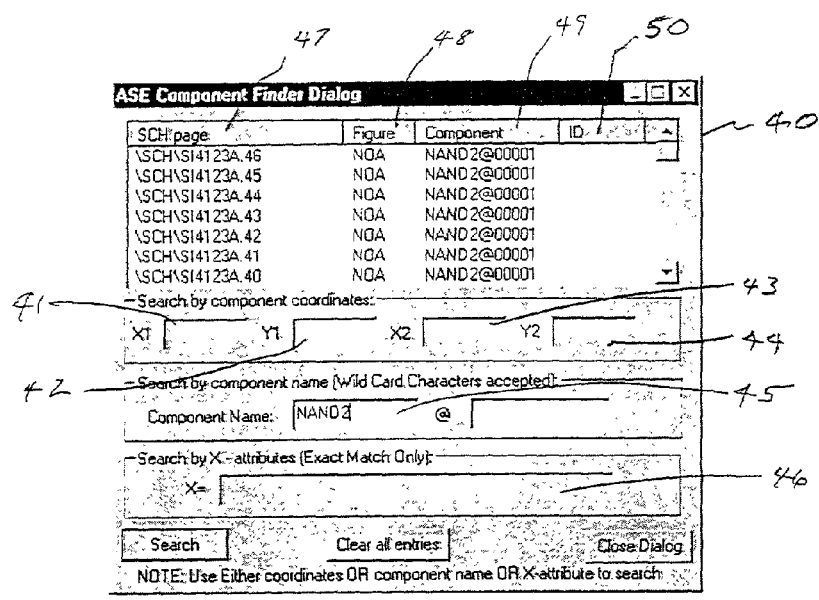
FIG. 4 shows the expanded cell or component search GUI.

As shown in FIG. 4 on expanded GUI 40, the Cell/Component module has a number of search options available. A component may be searched by its coordinates X1, Y1 and X2, Y2, the coordinates being entered into boxes 41, 42, 43 and 44. Only an X, Y coordinate is required for a transistor, however for gates and cells/components, a pair of X, Y coordinates are required to fully define the position of the cell. A cell/component may also be searched by name label which is entered into box 45; wild card characters are supported by the name label search. Finally, cell/components may be searched by attributes which are entered into box 46.

The cell/component search module outputs the search results in records with four fields as shown on FIG. 4. The first column 47 lists the schematic pages on which the cell/component is found. The second column 48 indicates the figure of the component which is a user defined property of a schematic page and may reflect project hierarchy. The third column 49 identifies the actual component and the fourth column 50 assigns a schematic view ID string as per Viewlogic applications.

The Local Segments Editor module has been designed to clean up extra pin or ending segments of nets that are local on a current page. This type of segments is an erroneous result of ViewGen when it generates schematics from wire files. The existence of the segments misleads analysts by showing net splits where they do not exist.

The functionality of the software includes following steps:
1. All ending segment labels on a currently active page are read
2. A search is made for the same labels through all project source files to identify whether labels are local or global; and
3. For the current page labels that are local, the ending segment is removed by executing OLE command: delete segment.

Labels may be made invisible either on a currently active/open page or on all of the schematic pages. Button 16 on FIG. 1 is the Make local labels invisible on the current page while button 17 is the Make local labels invisible on all pages. The functional difference is in the scope of the source data modification. The current page only function modifies the OLE objects only of the currently active schematic page, while the all pages function modifies the complete project source file data on disk. The label of a net is local if the label string doesn't exist anywhere else but on the currently active page.

The functionality of the software includes the following steps:
1. All labels from schematic files are read into a string array;
2. The array is modified to hold unique labels only relevant to the pages on which they exist, there is no repetition to speed up the search;
3. The array members are analyzed whether they exist on more then one page. A label is local if it doesn't exist on any page other then the current active page;
4. For the local labels found, the software executes the OLE Viewlogic command: make label invisible.

The Add IN/OUT elements to pin segments module is designed to automate page input/output completion editing by adding in/out pin elements.

The functionality of the software includes the following steps:
1. All net labels are read into a string array;
2. A library of the current project that contains input and output components to be used is located;
3. One array member is taken at a time to search for a pin or ending segment and the pin coordinates;
4. If a pin segment is found, there will be an add component OLE Viewlogic command executed to attach an appropriate I/O component;
5. Steps 3 and 4 is repeated for each net label array member; and
6. Each new I/O component will be labelled accordingly with the net label.

Figure 5:
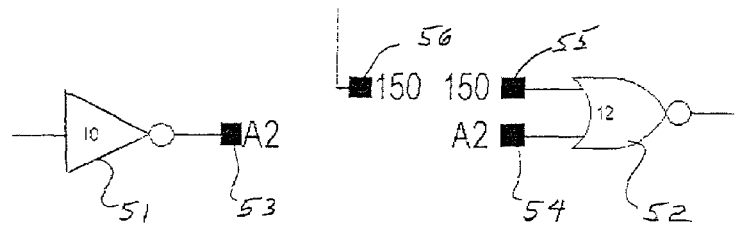
FIGS. 5 and 6 illustrate the functionality of the add IN/OUT elements to pin segments module.

The illustration in FIG. 5 shows a partial screen having cells 51 and 52 before the add IN/OUT elements to pin segments module is activated. Cell 51 has an pin segment 53 having a signal A2 while cell 52 has an input pin segment 54 having a signal A2. In addition, cell 52 has a further input pin segment 55 having a signal 150. Further on the schematic, a net segment 56 having a signal 150 is also shown.

Figure 6:
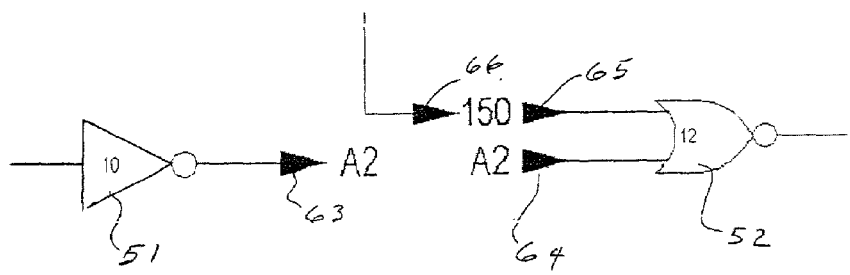

The illustration in FIG. 6 shows a partial screen having the same cells 51 and 52 after the add IN/OUT elements to pin segments module is activated. Cell 51 now has an output element 63 with its output signal A2 which is applied as an input signal A2 to an input element 64 of cell 52. In addition, a net output element 66 is shown to have an output signal 150 which is applied to the input element 65 of cell 52.

The "Net cutter" module combines an ASE ability to read, store, and analyze arrays of net and component data with an ability to execute OLE Viewlogic functions such as delete net, draw segments, and create text label.

The functionality of the software includes the following steps:
1. A user selected segment of a net is located;
2. Using OLE link, the label of the net of the segment selected is read;
3. The delete segment ViewDraw OLE command is executed;
4. Single segments on either side of the deleted segment are draws. The software validated newly created segments on the both sides by checking whether they short any other nets that may lay underneath or on top of the deleted segment. If there is a short on either side the software will extend the length of the shorted segment one grid size at a time until no short occurs;
5. Visible labels on both sides of the cut segment are created; and
6. Both labels are aligned to be clearly identified as input and/or output label based on their orientation.

Figure 7:
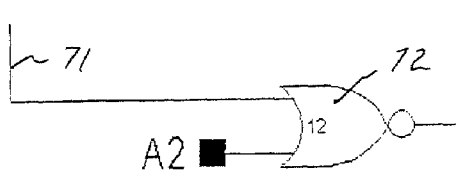
FIGS. 7 and 8 illustrate the functionality of the net cutter module.
Figure 8:
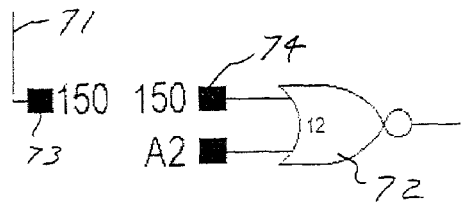

FIGS. 7 and 8 illustrate an example of a result of the net cutter functionality. In FIG. 7, a net 71 is illustrated as being connected to cell 72. In FIG. 8 the net 71 has been severed so as to have two segments 73 and 74. However, in addition the signal label 150 is attached to each of the segments 73 and 74. If the net 71 had simply been cut, by the ViewDraw cut function, the label 150 of he net 71 would have been lost.

In order to provide clients who do not have access to ViewDraw, the ability to view and navigate through a project schematic, a ViewLogic/Innoveda controller plug-in is provided. The client receives a self-contained project including a project viewer, combined with all of the necessary schematics and auxiliary data in the form of SI Navigator. This stand alone application may be contained on a computer readable medium such as a CD-ROM.

SI Navigator opens project data files and navigates through them in a number of ways. The list of schematic page/figure numbers may be called up, and when a figure number is clicked, the schematic will pop up on the screen. Alternately, if any signal on a schematic is clicked, all of the schematic pages having that particular signal will be identified and listed. These schematic pages may be brought onto the screen, again by clicking a particular page number or by clicking on an object such as a cell, a net or wire, a signal label or a segment.

To reduce the design and maintenance burden, the project viewer utilizes Viewlogic ACTIVEDRAW ActiveX control to output schematic images and project file search capabilities to enable users to view, trace, and search for objects globally throughout a complete project. The control has been designed by Viewlogic developers to support web based applications. However the nature of ActiveX allows it to be used in Windows applications as well.

Figure 9:
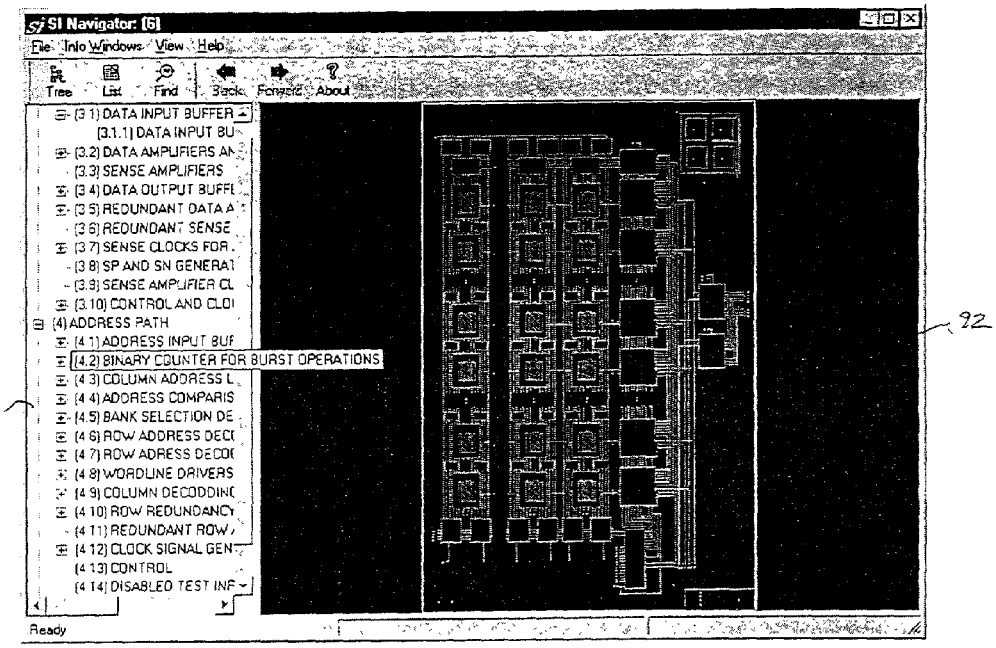
FIG. 9 illustrates the GUI for the SI Navigator.
Figure 10B:
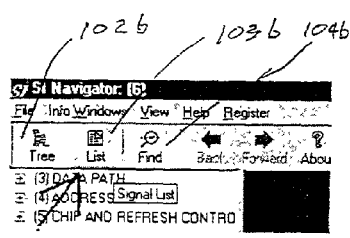
FIGS. 10a and 10b illustrate three menu or button options.
Figure 10A:
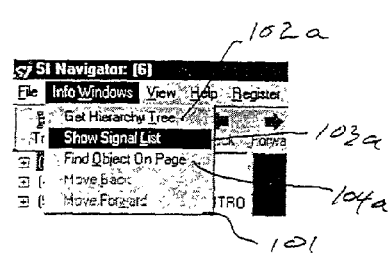

The main GUI as shown in FIG. 9 is a split view window 90. The left pane 91 holds a CTreeView control to show a project structure based on Figure/Page numbers assigned by the analysts. The application accommodates Viewlogic ACTIVEDRAW ActiveX control as the right pane 92 of the split view. The main GUI provides for three options—as illustrated in FIGS. 10a and 10b where 10a shows the pull down menu 101 with items Get Hierarchy Tree 102a, Show Signal List 103a and Find Object on Page 104a. Buttons 102b, 103b and 104b on FIG. 10b correspond to these three menu items.

The Tree option 102a allows a user to move back and forth through the pages of a schematic.

Figure 11:
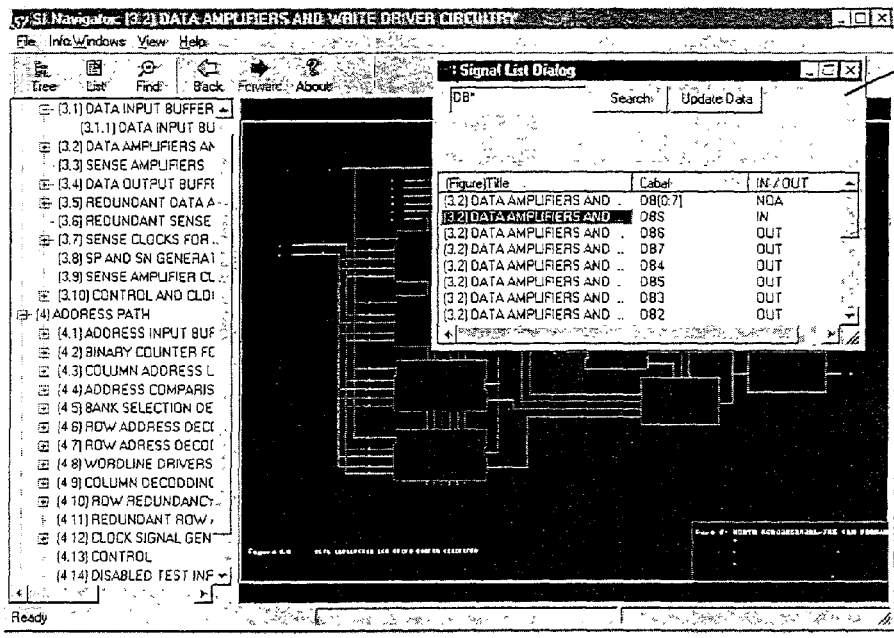
FIG. 11 illustrates the signal list window.
Figure 12:
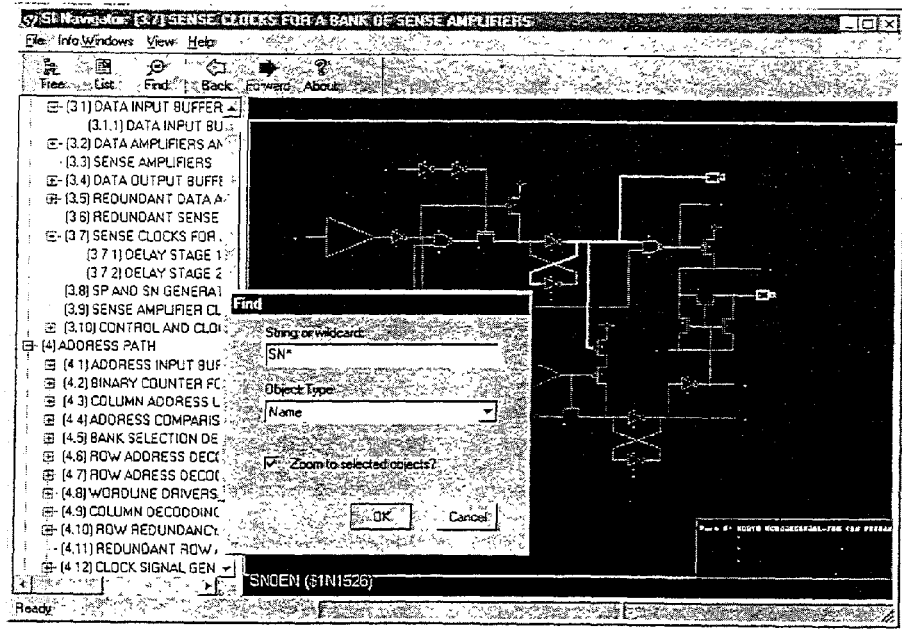
FIG. 12 illustrates an object find window.

The List option 103a provides the user a signal list dialog window 111 as seen in FIG. 11 with the signal data of the currently active page. In addition, an exact string or search pattern may be searched or a different current page data may be accessed. By double clicking on an object, the object will be found either on the current page or a different one and will be highlighted on the schematic 121 as shown in FIG. 12.

The Find option 104a provides a user with Viewlogic ActiveXcontrol building object search for a current page.

SI Navigator is particularly advantageous in that it complements design analysis reports by providing the user a fast, interactive facility to trace signals and study circuit hierarchy. It takes advantage of the computer's ability to search and index so that a user pinpoint circuit objects and view a list of all schematics in which the object appears, quickly and easily.

Figure 13:
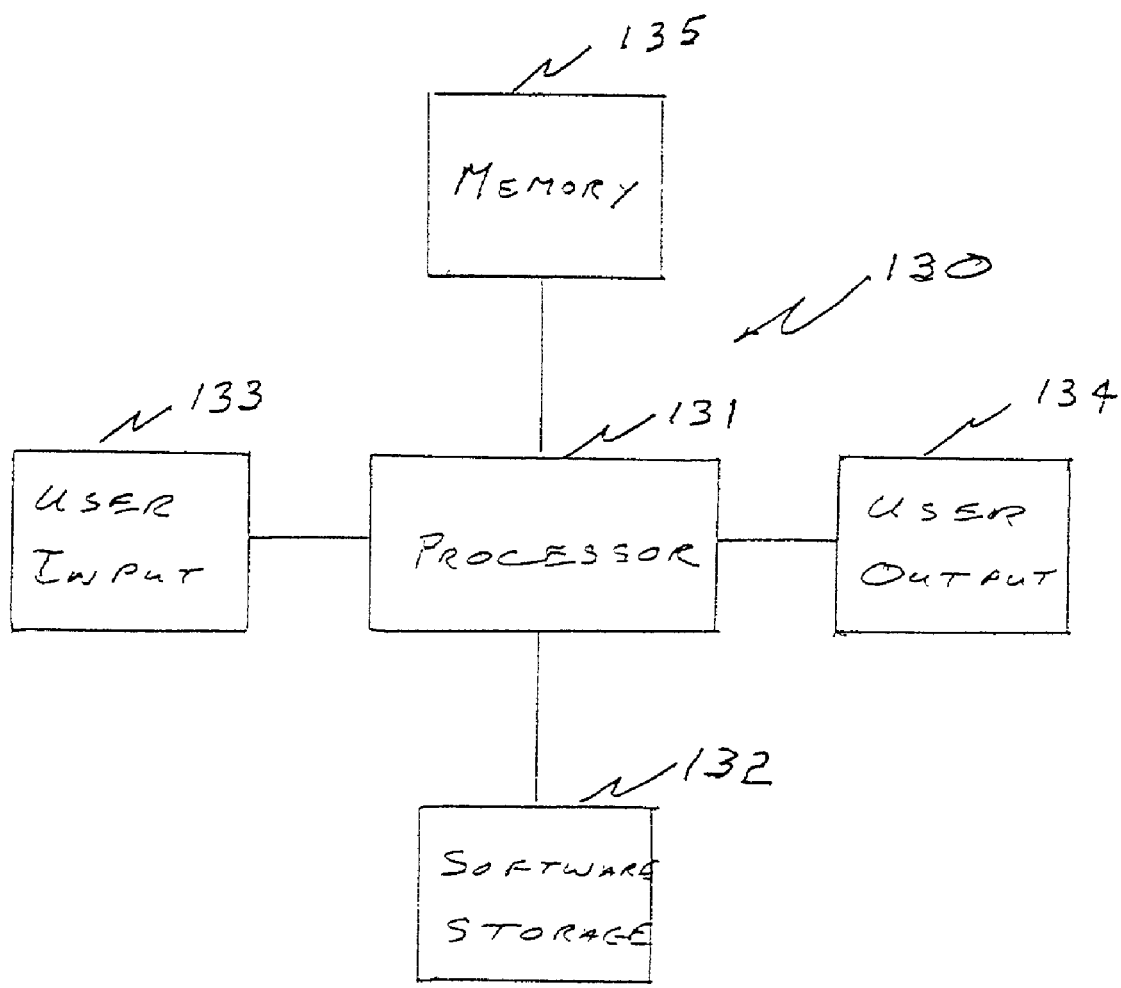
FIG. 13 illustrates a computer system for use with the present invention.

The advanced schematic editor in accordance with the present invention may be implemented using a computer system 130 of the type illustrated in FIG. 13. The system includes a processor 131 connected to a software storage device 132 which controls the processor 131, a user input device 133 for inputting data and instruction to the system 130, a user output device 134 and a memory 135 for storing cell data and data generated by the system. Such a system 130 may also be used to operate the SI Navigator described above. In such a case, the system processor 131 may gain access to the SI Navigator package either through a user input CD reader or a user input communications link to a memory located in a central computer.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. An editor in a computer system for a schematic having a number of pages comprising:
    a module for cutting a selected portion of the schematic from any one of the schematic pages, each page displaying a viewable area of the schematic at a given time within the editor;
    a module for pasting the cut portion of the schematic onto any one of the schematic pages;
    a module for connecting nets having the same label located on the same schematic page.

2. An editor as claimed in claim 1 which further includes a module for searching for objects within the schematic netlist.

3. An editor as claimed in claim 2 wherein the object is a signal label.

4. An editor as claimed in claim 3 wherein the module provides a list of signal labels found on a preselected schematic page.

5. An editor as claimed in claim 3 wherein the module provides a list of pages on which the signal label is found.

6. An editor as claimed in claim 2 wherein the object is a cell.

7. An editor as claimed in claim 6 wherein the module provides a list of cells found on a preselected schematic page.

8. An editor as claimed in claim 6 wherein the cell may be searched using one of the following: cell coordinates, name label or attributes.

9. An editor as claimed in claim 6 wherein the module provides a list of schematic pages on which the cell is found.

10. An editor as claimed in claim 1 which further includes a module for eliminating extra pins or segment endings on a schematic.

11. An editor as claimed in claim 1 which further includes a module for rendering invisible the labels on a current active page or on all of the schematic pages.

12. An editor as claimed in claim 1 which further includes a module for adding IN/OUT elements to pin segments.

13. An editor as claimed in claim 1 which further includes a module for cutting a net on a schematic and providing a signal label to the two cut ends of the net.

14. A computer-readable medium containing project viewer software and project schematic netlist data including schematic page numbers, cell names, nets, signal labels and segments,
    wherein the project viewer software is configured to edit a schematic having a number of pages.

15. A computer-readable medium as claimed in claim 14 wherein the project viewer software controls output schematic symbols and enables a user to view, trace and search objects throughout the project netlist data.

16. A process in a computer system as claimed in claim 14 wherein the hierarchal structure is organized by schematic pages.

17. A process in a computer system for interactively viewing netlist data from a high level schematic including schematic page numbers, cell names, nets, signal labels and segments, the viewing process comprising:
    generating the hierarchal structure of the schematic on one pane of a split screen;
    generating a selected part of the schematic on another pane of the split screen;
    generating a list of cell names in a window on the screen; and
    generating a list of signal labels in a window on the screen.

* * * * *